US012675087B2

(12) United States Patent
Feng et al.

(10) Patent No.: US 12,675,087 B2
(45) Date of Patent: Jul. 7, 2026

(54) MULTI-CHANNEL ACTUATOR FOR DRIVING A LOW-SIDE DEVICE

(71) Applicant: STMicroelectronics International N.V., Geneva (CH)

(72) Inventors: Guozhu Feng, Shenzhen (CN); Allan Rio Valentos Lagasca, Paranaque (PH)

(73) Assignee: STMicroelectronics International N.V., Geneva (CH)

( * ) Notice: Subject to any disclaimer, the term of this patent is extended or adjusted under 35 U.S.C. 154(b) by 341 days.

(21) Appl. No.: 18/478,486

(22) Filed: Sep. 29, 2023

(65) Prior Publication Data

US 2025/0110462 A1    Apr. 3, 2025

(51) Int. Cl.
*G05B 19/042*     (2006.01)
*G05B 23/02*     (2006.01)
*H05B 45/20*     (2020.01)
*H05B 45/325*     (2020.01)

(52) U.S. Cl.
CPC ..... *G05B 19/0423* (2013.01); *G05B 23/0208* (2013.01); *H05B 45/20* (2020.01); *H05B 45/325* (2020.01)

(58) Field of Classification Search
None
See application file for complete search history.

(56) References Cited

U.S. PATENT DOCUMENTS

| | | | | |
|---|---|---|---|---|
| 7,129,652 | B2 * | 10/2006 | Patel | H05B 45/40 |
| | | | | 315/363 |
| 9,443,431 | B1 * | 9/2016 | Laird | H02M 3/07 |
| 2006/0241794 | A1 * | 10/2006 | Burkatovsky | G05B 19/0426 |
| | | | | 700/86 |
| 2013/0250464 | A1 | 9/2013 | Fish et al. | |
| 2019/0334720 | A1 | 10/2019 | Zeh et al. | |
| 2020/0272120 | A1 * | 8/2020 | Fujimura | H02P 5/68 |
| 2021/0050736 | A1 | 2/2021 | Bordes et al. | |
| 2021/0265907 | A1 | 8/2021 | Malone et al. | |
| 2022/0352841 | A1 | 11/2022 | Steinberger et al. | |

OTHER PUBLICATIONS

STMicroelectronics, "Arm® Cortex®—M0+ 32-bit MCU, up to 128 KB Flash, 36 KB RAM, 4x USART, timers, ADC, DAC, comm. I/Fs, 1.7-3.6V," Datasheet—production data, STM32G071x8/xB, DS 12232 Rev 4, Sep. 2021, 135 pages.

(Continued)

*Primary Examiner* — Anh Q Tran
(74) *Attorney, Agent, or Firm* — Seed Intellectual Property Law Group LLP

(57)           ABSTRACT
Provided is a multi-channel actuator for driving a low-side device. The actuator includes a controller that receives a first command for driving a low-side device and outputs data representative of the first command. The actuator includes a driving circuit having a plurality of detection and driving stages. The plurality of detection and driving stages are operative to be coupled to a plurality of channels of the low-side device, respectively. The driving circuit receives the data representative of the first command and causes a detection and driving stage of the plurality of detection and driving stages to drive a respective channel of the low-side device in accordance with the first command.

20 Claims, 5 Drawing Sheets

(56)     References Cited

OTHER PUBLICATIONS

STMicroelectronics, "Dual channel transceiver IC for SIO and
IO-Link sensor applications," Datasheet, L6364, DS13363—Rev 4,
Oct. 2021, 60 pages.
Stmicroelectronics, "IO-Link actuator for industrial tower light
based on L6364," Data brief, Stdes-Iodtlight, DB4841—Rev 2, May
2023, 6 pages.
STMicroelectronics, "Quad low-side intelligent power switch,"
Datasheet, IPS4260L, DS12305—Rev 5, Jul. 2021, 29 pages.

* cited by examiner

*122a*

RED _____ 124

GREEN _____ 126

YELLOW _____ 128

Buzzer _____ 130

122

114

116

118

120

MULTI-CHANNEL ACTUATOR FOR DRIVING A LOW-SIDE DEVICE

BACKGROUND

Technical Field

This application is directed to a multi-channel actuator for driving a low-side device, and, in particular, a multi-channel actuator that provides status reporting to an IO-Link compliant system.

Description of the Related Art

Actuators have a wide variety of applications, such as industrial sector applications and factory automation applications. For example, a factory floor may have tower lights, valves, pumps, relays or a combination thereof that are driven by actuators. Actuators facilitate controlling and operating a factory floor. As the complexity of automation increases, demand is growing for versatile actuators that have varying functionality and actuators that use standardized protocols for communications and networking.

BRIEF SUMMARY

Provided is a multi-channel actuator. The multi-channel actuator may be used to drive a tower light, valve, pump or relay, among others. The actuator includes a physical connector that may be IO-Link compliant. The connector may have three wires, whereby a first wire may be used to communicate bidirectionally with a higher layer IO-Link compliant system (which may be a computer), a second wire may be used for power and a third wire may be used for reference voltage or ground.

The multi-channel actuator also includes a communication device (or a transceiver). The transceiver receives and decodes commands received from the higher layer IO-Link compliant system. The transceiver may encode the commands and transmit the commands to a controller of the actuator. The transceiver receives diagnostic and event information from the controller and decodes the diagnostic and event information. The transceiver encodes the diagnostic and event information for transmission over the connector to the IO-Link compliant system.

The controller controls a driving stage of the actuator. The driving stage drives multiple channels of a low-side device, such as a tower light, valve, pump or relay. The driving stage uses the channels to send signals that control the operation of the low-side device. The driving stage detects whether a supply voltage is less than a threshold for the supply voltage and stores a cutoff delay time and a programmable current limit. The driving stage also detects whether there is an open load, whether a current limit is reached and whether a temperature of a transistor of the driving stage exceeds a threshold. The driving stage reports detection results to the controller, which in turn send the detection results to the IO-Link compliant system (e.g., computer). Thus, real-time status data is provided to the IO-Link compliant system for managing the low-side device and other low-side devices in a facility.

DETAILED DESCRIPTION

Figure 1:
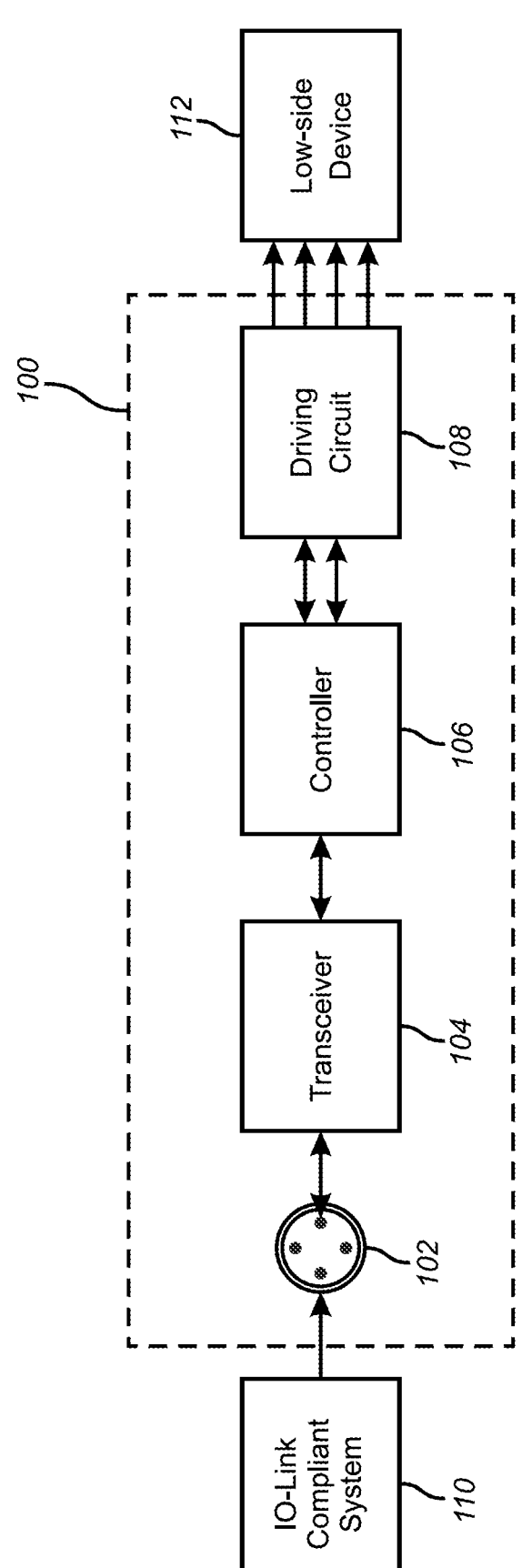
FIG. 1 shows a block diagram of an actuator.

FIG. 1 shows a block diagram of an actuator 100. The actuator 100 includes a connector 102, a transceiver 104, a controller 106 and a driving circuit 108. The actuator 100 is operative to be coupled to an IO-Link compliant system (e.g., computer) 110 and a low-side device 112 for driving the low-side device 112.

The connector 102 may be compliant with the IO-Link communication protocol. The connector 102 may enable the actuator 100 to communicate with the IO-Link compliant system 110, whereby the IO-Link compliant system 110 may be a higher-level control system. The connector 102 enables bidirectional communication between the actuator 100 and the IO-Link compliant system 110. The connector 102 may be a three-wire interface, whereby a first wire is used for bidirectional communication and second and third wires are used for power supply. The connector 102 may be an IO-Link master.

The transceiver 104 may be a bridge between the controller 106 and the connector 102. The transceiver 104 may perform physical layer processing on data received from the connector 102 and relayed to the controller 106. The transceiver 104 may also perform physical layer processing on data received from the controller 106 and sent to the connector 102.

The controller 106 may be any processing circuitry operative to control the low-side device 112. The controller 106 may, for example, be a processor or a microcontroller, among others. The controller 106 may include an arithmetic and logic unit (ALU). The controller 106 may receive, via the transceiver 104, commands or signals sent from the IO-Link compliant system 110. The controller may issue commands (or signals) to the driving circuit 108 for driving the low-side device 112.

The driving circuit 108 may receive commands from the controller 106. The driving circuit may send driving signals to the low-side device 112 in accordance with the received commands. For example, if the low-side device 112 is a tower light having multiple lights and a buzzer, and the driving circuit 108 may send to one or more signals to the tower light indicating the lights to be turned on and whether the buzzer is to be activated.

Figure 2:
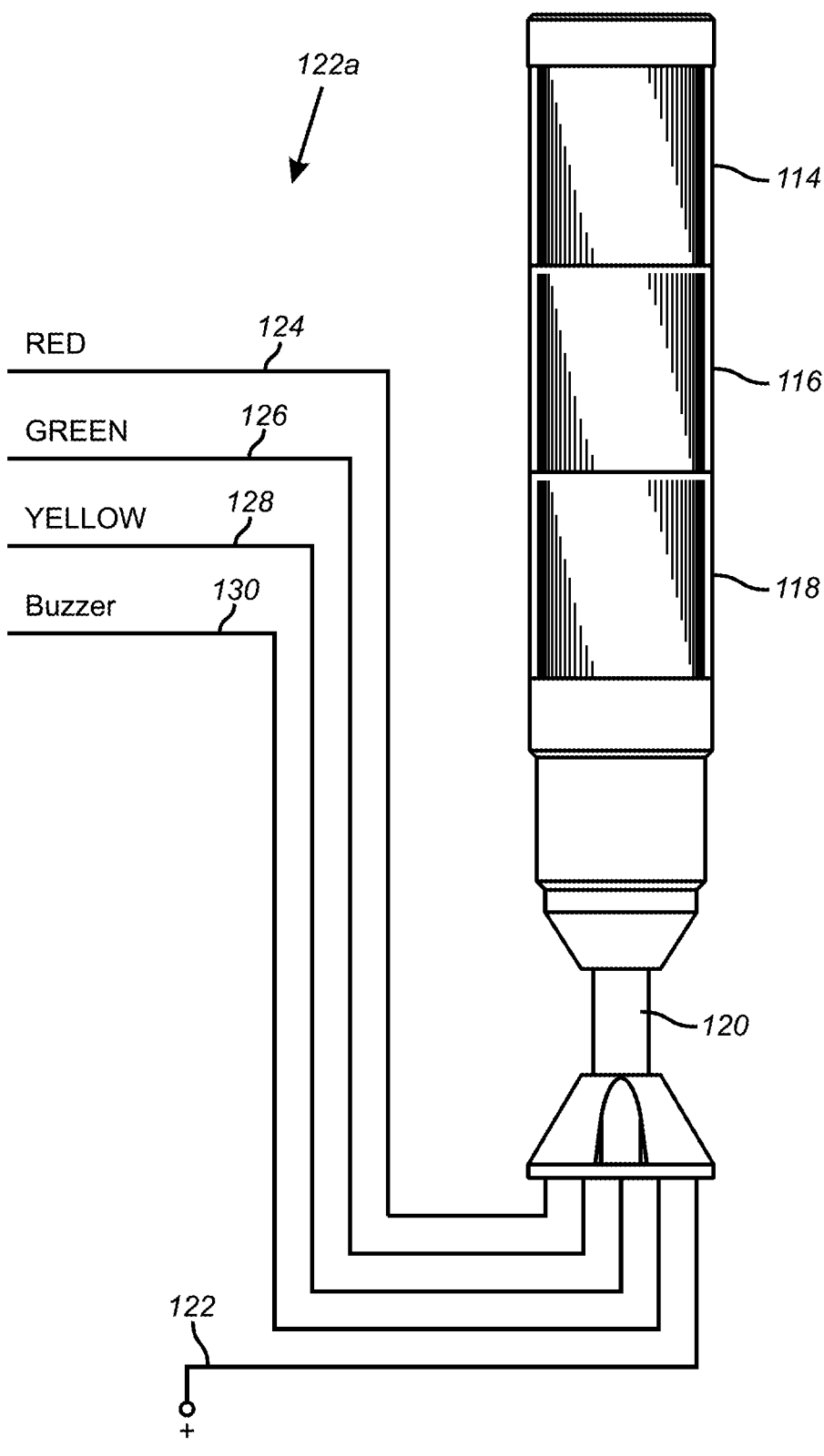
FIG. 2 shows a tower light.

FIG. 2 shows a tower light 112a. The tower light 112a is an example of low-side device. The tower light 112a has first, second and third light sources 114, 116, 118 and a buzzer 120. The first, second and third light sources 114, 116, 118 may be red, green and yellow light sources, respectively. The tower light 112a has a power line 122 over which the tower light 112a receives electric power.

The tower light 112a has first, second and third light lines 124, 126, 120 and a buzzer line 130. The first, second and third light lines 124, 126, 120 and the buzzer line 130 may be coupled to the driving circuit 108. The driving circuit 108 sends driving signals over the first, second and third light lines 124, 126, 120 for turning the first, second and third lights 114, 116, 118, respectively, between the on and off states. The driving circuit 102 sends a driving signal over the buzzer line 130 for determining the buzzer 120 on and off.

For example, a driving signal may be activated (e.g., high, asserted or set to logical one) to turn on a respective light 114, 116, 118 or the buzzer 120. Further, the driving signal may be deactivated (e.g., low, deasserted or set to logical zero) to turn off a respective light 114, 116, 118 or the buzzer 120. A different convention may be adopted and the driving signal may be asserted to turn off the light 114, 116, 118 or the buzzer 120 and deasserted to turn on the light 114, 116, 118 or the buzzer 120.

Figure 3:
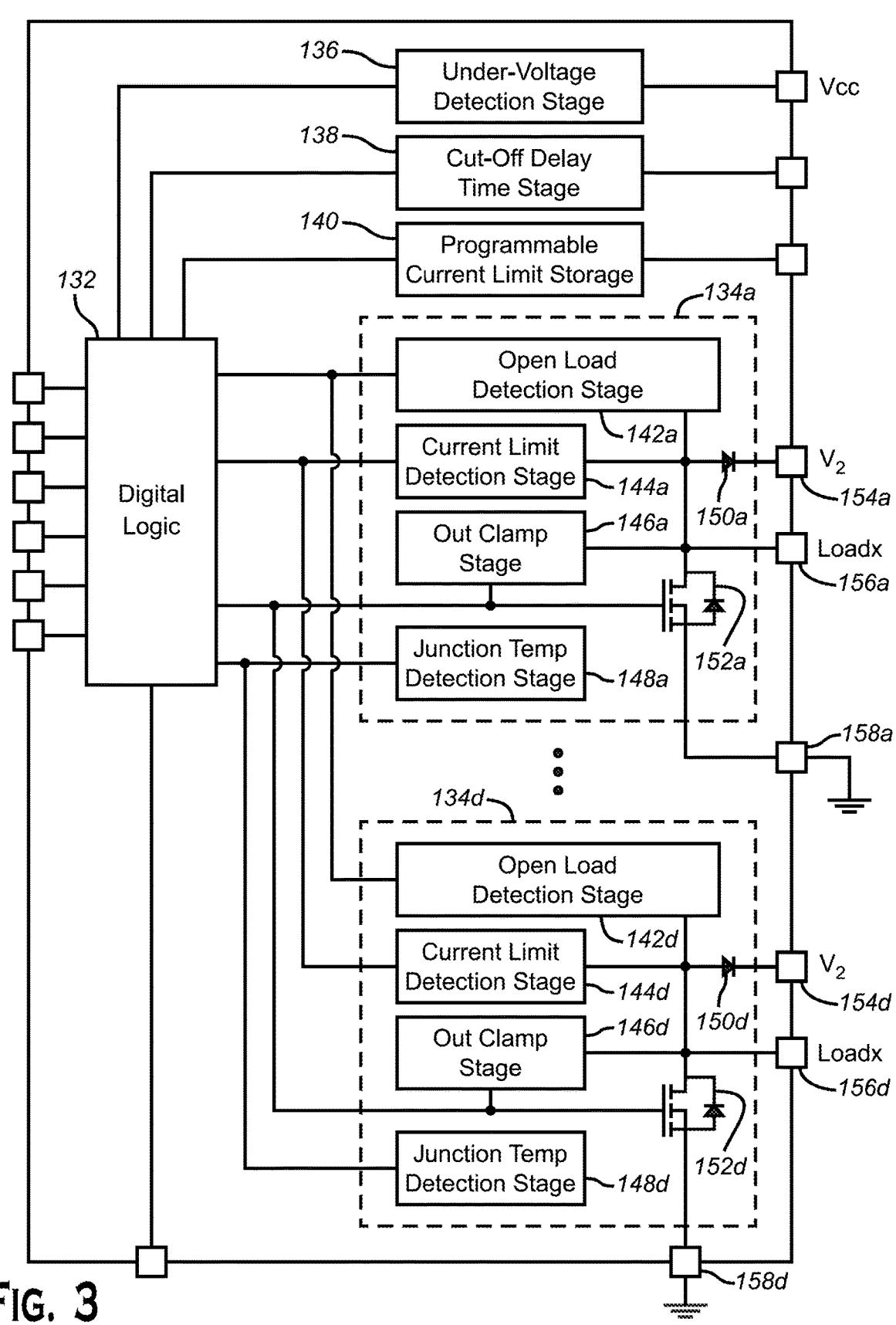
FIG. 3 shows a diagram of the driving circuit in accordance with an embodiment.

FIG. 3 shows a diagram of the driving circuit 108a in accordance with an embodiment. The driving circuit 108a includes digital logic 132, a plurality of detection and driving stages 134 (of which two detection and driving stages 134a, 134d are shown), an under-voltage detection stage 136, a cutoff delay time stage 138 and a programmable current limit stage 140. Each detection and driving stage 134a,d includes an open load detection stage 142a,d, a current limit detection stage 144a,d, an out clamp stage 146a,d, a junction temperature detection stage 148a,d, a diode 150a,d and a transistor 152a,d.

The digital logic 132 is coupled to the controller 106, the plurality of detection and driving stages 134, the under-voltage detection stage 136, the cutoff delay time stage 138 and the programmable current limit stage 140. The digital logic 132 may receive commands from the controller and send commands to the plurality of detection and driving stages 134. The plurality of detection and driving stages 134 may in turn drive the low-side device 112 in accordance with the commands.

The digital logic 132 also receives detection results from the plurality of detection and driving stages 134, the under-voltage detection stage 136, the cutoff delay time stage 138 and the programmable current limit stage 140. The digital logic 132 sends the detection results to the controller 106. The controller 106 may processor the detection results and report the detection results to the IO-Link compliant system 110.

The under-voltage detection stage 136 may be coupled to a pin of the driving stage 108a. The under-voltage detection stage 136 may receive a supply voltage over the pin. The detection stage may determine whether the supply voltage is below a threshold for supply voltage. If the under-voltage detection stage 136 determines that the supply voltage is below the threshold, the under-voltage detection stage 136 may send a signal to the digital logic indicating that the supply voltage is below the threshold.

The cutoff delay time stage 138 may be coupled to a pin of the driving stage 108a. The cutoff delay time stage 138 may receive and store a programmable cutoff delay time for overcurrent operation. The cutoff delay time limits the duration of a current limitation condition of the driving stage 108a. The programmable current limit stage 140 receives a current limitation value via a pin of the driving stage 108a. The current limitation value represents a limit on the load current flowing through the driving stage 108a.

Each detection and driving stage 134a,d is coupled to a respective load clamp voltage pin 154a,d, a respective channel pin 156a,d and a respective reference voltage pin 158a,d. The reference voltage pin 158a,d may be coupled to ground. The diode 150a,d of each stage 134a,d has a cathode coupled to the respective load clamp voltage pin 154a,d and an anode coupled to the respective channel pin 156a,d.

The transistor 152a,d of each stage 134a,d has a first conduction terminal coupled to the respective channel pin 156a,d and a second conduction terminal coupled to the respective reference voltage pin 158a,d. The transistor 152a,d of each stage 134a,d has a control terminal coupled to the digital logic 132. The digital logic 132 the drives the transistor 152a,d to be conductive or nonconductive in accordance with the commands received from the controller 106. It is noted that the transistor 152a,d is in a low-side configuration. Accordingly, the low-side device 112 may be connected between the power supply pin and the respective channel pin 156a,d.

The first, second and third light lines 124, 126, 120 and the buzzer line 130 may be coupled to the channel pins 156a-d, respectively. Accordingly, each detection and driving stage 134a-d may drive a line of the tower light 122a to cause the lights 114, 116, 118 and the buzzer 122 turned on and off.

Further, in the event that the low-side device 112 is a relay pump, a magnetic valve or an actuator, various lines of the low-side device 112 may be coupled to respective channel pins 156a-d. Each detection and driving stage 134a-d drives one of the lines of the low-side device 112 to cause the low-side device 112 to operate as commanded by the IO-Link compliant system 110 or the controller 106.

In each detection and driving stage 134a-d, the open load detection stage 142a-d is coupled to the channel pin 156a-d. The open load detection stage 142a-d determines whether the low-side device 112 or line thereof has been disconnected from the driving circuit 108. If this connection is detected, the open load detection stage 142a-d sends a signal to the digital logic 132 indicating the connection. The digital logic may send data indicating the disconnection to the controller 106, which may send data indicating the connection to the IO-Link compliant system 110.

In each detection and driving stage 134a-d, the current limit detection stage 144a-d is coupled to the channel pin 156a-d. The current limit detection stage 142a-d determines whether the current flowing to the low-side device 112 or line thereof meets a condition. The condition may be the current being higher than a threshold current or lower than the threshold current. If the condition is determined to be met, the current limit detection stage 142a-d sends a signal to the digital logic 132 indicating that the condition is met. The digital logic may send data indicating that the condition is met to the controller 106, which may send data indicating that the condition is met to the IO-Link compliant system 110. The IO-Link compliant system 110 may control a plurality of low-side devices (for example, in an industrial site). The controller 110 may use the reported data to determine an operational state of the low-side devices.

In each detection and driving stage 134a-d, the junction temperature detection stage 148a-d detects a temperature of the detection and driving stage 134a-d or a temperature of the transistor 152a,d of the detection and driving stage 134a-d. The junction temperature detection stage 148a-d may report the detected temperature to the digital logic. The junction temperature detection stage 148a-d may compare the detected temperature to a threshold and determine whether the detected temperature exceeds the threshold. The junction temperature detection stage 148a-d may send a signal to the digital logic 132 indicating that the detected temperature exceeded the threshold. The digital logic 132 may send data indicating that the detected temperature exceeded the threshold to the controller 106, which may send data indicating that the detected temperature exceeded the threshold to the IO-Link compliant system 110.

Figure 4:
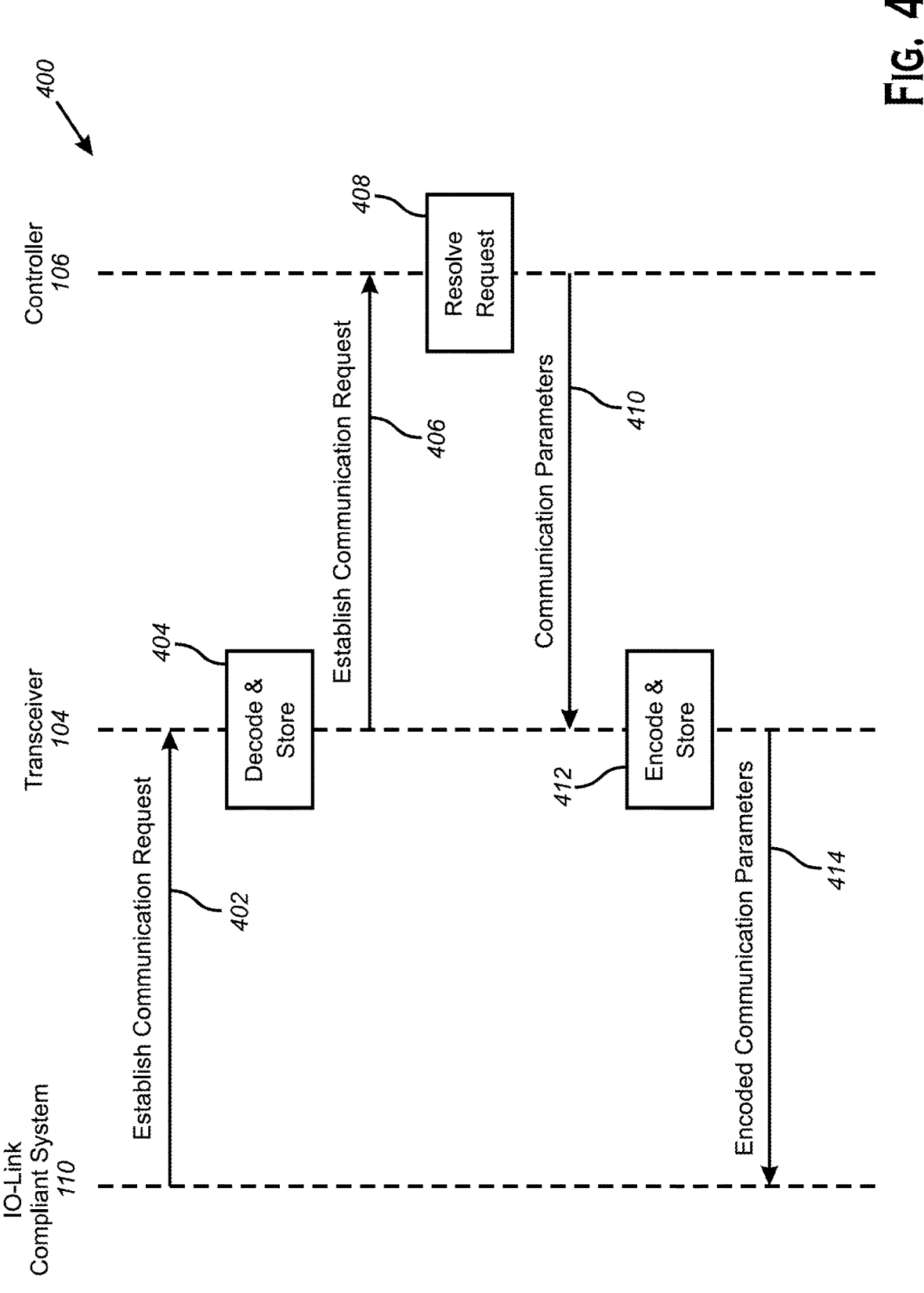
FIG. 4 shows a message flow for establishing communication between the IO-Link compliant system and the actuator.

FIG. 4 shows a message flow 400 for establishing communication between the IO-Link compliant system 110 and the actuator 100. The IO-Link compliant system 110 determines to establish communication with the actuator 100. At 402, the IO-Link compliant system 110 sends a request to establish communication to the actuator 100. The transceiver 104 receives the request to establish communication. At 404, the transceiver 104 decodes the request to establish communication and stores the request to establish communication in a buffer of the transceiver 104. At 406, the transceiver 104 sends a request to establish communication to the controller 106.

At 408, the controller 106 resolves the request to establish communication. The request may be in accordance with the IO-Link communication protocol. At 410, the controller 106 sends communication parameters to the transceiver 104. The communication parameters may include a communication cycle time, a device identity of the controller 106 or actuator 100, a device name of the controller 106 or actuator 100 or a combination thereof. The transceiver 104 receives the communication parameters.

At 412, the transceiver 104 encodes the communication parameters in a frame and stores the communication parameters in the buffer of the transceiver 104. At 414, the transceiver 104 sends the encoded communication parameters to the IO-Link compliant system 110. The IO-Link compliant system 110 may establish communication with the actuator 100 using the communication parameters. The IO-Link compliant system 110 may communication with the actuator 100 to operate one or more low-side devices coupled to the actuator 100.

Figure 5:
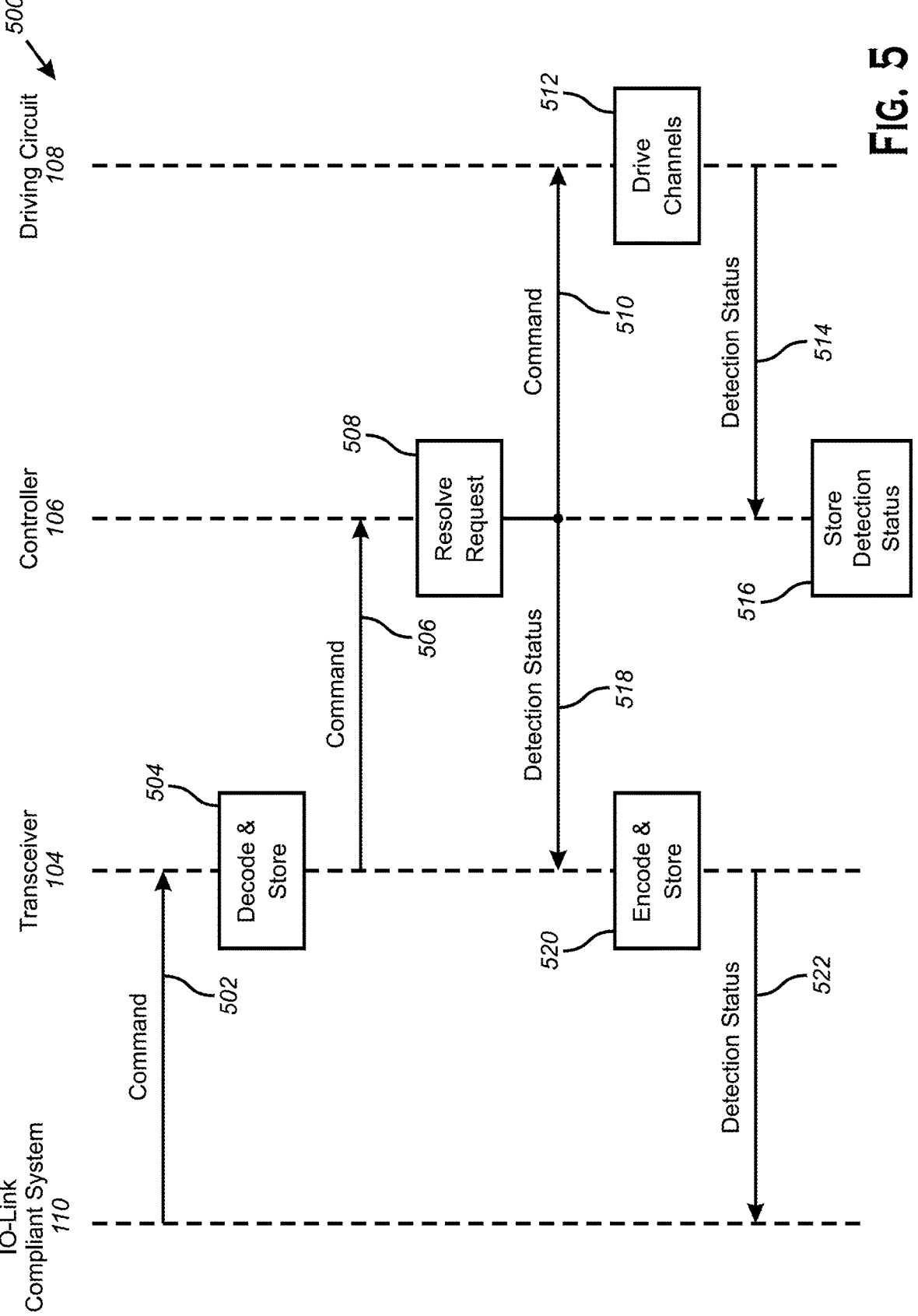
FIG. 5 shows a message flow for an operation cycle of the actuator.

FIG. 5 shows a message flow 500 for an operation cycle of the actuator 100. At 502, the controller 110 sends a command using the IO-Link communication protocol to the actuator 100. The transceiver 104 receives the command. At 504, the transceiver 104 decodes and stores the command in a buffer. At 506, the transceiver 104 send data representative of the command to the controller 106. The controller 106 receives the data representative of the command. At 508, the controller 106 resolves the data representative of the command and determines action to be taken based on the command. At 510, the controller 106 sends data representative of the action to be taken to the driving circuit 108.

At 512, the driving circuit 108 drives one or more channels of the low-side device based on the data. For example, the driving circuit 108 may operate the relay pump, magnetic valve or tower light based on the data. Furthermore, the driving circuit 108 may obtain detection information. For example, the driving circuit 108 may determine whether a channel is an open load or whether there is an over-temperature or an under-voltage as described herein. The driving circuit 108 sends detection status information to the controller 106 at 514. The controller 106 receives the detection status information at 516 and stores the detection status information at 518.

It is noted that in response to receiving the data representative of the command, the controller 106, sends stored detection status information to the transceiver 104 at 518. The stored detection status information may be obtained by the controller 106 from the driving circuit 108 during a previous operation cycle.

At 520, the transceiver 104 encodes the detection status information in a frame and stores the detection status information in a buffer. The transceiver 104 then sends the detection status information to the IO-Link compliant system 110 at 522. The IO-Link compliant system 110 may issue an alarm based on the detection status information. For example, the IO-Link compliant system 110 may alert a user if a channel is an open load or if an over-temperature or an under-voltage condition is detected by the driving circuit 108. The actuator 100 may be used to drive various resistive and inductive loads and may provide diagnostic functions in factory automation system, among others.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An actuator, comprising:
   a controller configured to:
      receive a first command for driving a low-side device; and
      output data representative of the first command; and
   a driving circuit having a plurality of detection and driving stages that are operative to be coupled to a plurality of channels of the low-side device, respectively, the low-side device being a tower light having four channels that include a first channel for a first light source of the tower light, a second channel for a second light source of the tower light, a third channel for a third light source of the tower light and a fourth channel for a buzzer of the tower light, wherein the driving circuit is configured to:
      receive the data representative of the first command; and
      cause a detection and driving stage of the plurality of detection and driving stages to drive a respective channel of the low-side device in accordance with the first command.

2. The actuator of claim 1, comprising:
   a transceiver configured to:
   receive a second command over an IO-Link interface;
   decode the second command;
   generate the first command based on the second command; and
   output the first command to the controller.

3. The actuator of claim 1, wherein the detection and driving stage is configured to:
   determine whether a respective channel of the low-side device is disconnected from the detection and driving stage; and
   in response to determining that the respective channel of the low-side device is disconnected from the detection and driving stage, send, to the controller, data indicating that the respective channel is disconnected from the detection and driving stage.

4. The actuator of claim 1, wherein:
   the detection and driving stage includes:
   a transistor, and
   the detection and driving stage is configured to:
   detect a temperature of the transistor;
   determine whether the temperature is greater than a threshold; and
   in response to determining that the temperature is greater than the threshold, send a signal to the controller indicating that the temperature is greater than the threshold.

5. The actuator of claim 1, wherein the detection and driving stage is configured to:
   receive a supply voltage;
   determine whether the supply voltage is below a threshold for the supply voltage; and in response to determining that the supply voltage is below the threshold, send a signal to the controller indicating that the supply voltage is below the threshold.

6. The actuator of claim 1, wherein:

the plurality of detection and driving stages includes a first detection and driving stage coupled to the first channel and configured to drive the first light source, a second detection and driving stage coupled to the second channel and configured to drive the second light source, a third detection and driving stage coupled to the third channel and configured to drive the third light source and a fourth detection and driving stage coupled to the fourth channel and configured to drive the buzzer.

7. The actuator of claim 1, comprising:

a transceiver configured to:

receive a first request to establish communication from an IO-Link compliant system;

decode the first request to establish communication;

send a second request to establish communication to the controller, wherein:

the controller is configured to:

receive the second request to establish communication; and in response to receiving the second request to establish communication, send communication parameters to the transceiver, and wherein the transceiver is configured to send the communication parameters to the IO-Link compliant system.

8. The actuator of claim 7, wherein the communication parameters include a communication cycle time, a device identity of the controller or the actuator or a device name of the controller or the actuator.

9. A method, comprising:

receiving, by a controller of an actuator, a first command for driving a low-side device;

outputting, by the controller, data representative of the first command;

receiving, by a driving circuit, the data representative of the first command, wherein the driving circuit has a plurality of detection and driving stages that are operative to be coupled to a plurality of channels of the low-side device, respectively;

causing, by the driving circuit, a detection and driving stage of the plurality of detection and driving stages to drive a respective channel of the low-side device in accordance with the first command, the detection and driving stage including a transistor;

detecting, by the detection and driving stage, a temperature of the transistor;

determining, by the detection and driving stage, whether the temperature is greater than a temperature threshold; and in response to determining that the temperature is greater than the temperature threshold, sending, by the detection and driving stage, a signal to the controller indicating that the temperature is greater than the temperature threshold.

10. The method of claim 9, comprising:

receiving, by a transceiver, a second command over an IO-Link interface;

decode, by the transceiver, the second command;

generating, by the transceiver, the first command based on the second command; and outputting, by the transceiver, the first command to the controller.

11. The method of claim 9, wherein the low-side device is a tower light.

12. The method of claim 9, comprising:

determining, by the detection and driving stage, whether a respective channel of the low-side device is disconnected from the detection and driving stage; and in response to determining that the respective channel of the low-side device is disconnected from the detection and driving stage, sending, to the controller, data indicating that the channel is disconnected from the detection and driving stage.

13. The method of claim 9, comprising:

receiving, by the driving stage, a supply voltage;

determining, by the detection and driving stage, whether the supply voltage is below a threshold for the supply voltage; and in response to determining that the supply voltage is below the threshold for the supply voltage, sending, by the driving stage, a signal to the controller indicating that the supply voltage is below the threshold for the supply voltage.

14. A system, comprising:

an IO-Link compliant system;

a low-side device; and an actuator including:

a controller configured to:

receive, from the IO-Link compliant system, a first command for driving the low-side device; and output data representative of the first command; and a driving circuit having a plurality of detection and driving stages that are operative to be coupled to a plurality of channels of the low-side device, respectively, wherein the driving circuit is configured to:

receive the data representative of the first command; and cause a detection and driving stage of the plurality of detection and driving stages to drive a respective channel of the low-side device in accordance with the first command, the detection and driving stage including:

a transistor, and the detection and driving stage is configured to:

detect a temperature of the transistor;

determine whether the temperature is greater than a threshold; and in response to determining that the temperature is greater than the threshold, send a signal to the controller indicating that the temperature is greater than the threshold.

15. The system of claim 14, wherein the actuator includes:

a transceiver configured to:

receive a second command over an IO-Link interface;

decode the second command;

generate the first command based on the second command; and output the first command to the controller.

16. The system of claim 14, wherein the low-side device is a tower light.

17. The system of claim 14, wherein the detection and driving stage is configured to:

determine whether the respective channel of the low-side device is disconnected from the detection and driving stage; and in response to determining that the respective channel of the low-side device is disconnected from the detection and driving stage, send, to the controller, data indicating that the channel is disconnected from the detection and driving stage.

18. The method of claim 9, wherein the low-side device is a relay pump.

19. The method of claim 9, wherein the low-side device is a magnetic valve.

20. The system of claim 14, wherein the low-side device is a tower light having four channels that include a first channel for a first light source of the tower light, a second channel for a second light source of the tower light, a third channel for a third light source of the tower light and a fourth channel for a buzzer of the tower light.

\* \* \* \* \*